Patented Apr. 7, 1925.

1,532,271

UNITED STATES PATENT OFFICE.

RONALD JAMES SLAY, OF HATTIESBURG, MISSISSIPPI.

METHOD OF MANUFACTURING SIRUP.

No Drawing. Application filed June 15, 1921. Serial No. 477,853.

*To all whom it may concern:*

Be it known that I, RONALD J. SLAY, a citizen of the United States, residing at Hattiesburg, in the county of Forrest and State of Mississippi, have invented a new and useful Method of Manufacturing Sirup, of which the following is a specification.

This invention relates to a method of manufacturing sirup from the whole juice of the sugar cane (not sorghum) of that grade grown for example in southern Mississippi and other similar soils.

Cane sirup such as ordinarily produced by the open kettle process is merely a concentrated juice produced by boiling to the consistency of a sirup. Such a sirup has disadvantages due to the fact that the sucrose in the sirup soon crystallizes; the sugar quickly ferments; there is a lack of uniformity of color and consistency; and the food value of the sirup is materially reduced because of the removal of a large percentage of the sucrose.

It is an object of the present invention to improve the grade of sirup produced by overcoming all of the objections above noted.

In carrying out the process the crystallization of the sucrose is prevented by the use of acids which act to invert the cane sugar into glucose and fructose, sugars that are almost uncrystallizable.

The juice from the cane contains somewhat less than 20% of sucrose. In order to prevent crystallization of the sugar it has been found necessary to invert at least 50% of the sucrose present in the juice. To effect the inversion of the sucrose it is preferred to use either citric or tartaric acid. The inversion depends upon the amount of acid used and the boiling of the juice. It is first necessary to determine the percentage of sucrose in the juice. Of this amount 50% must be inverted so that if 20% of the juice is sucrose it will be necessary to invert 10%. Sufficient citric or tartaric acid is then added to effect the conversion of this percentage of sucrose. By actual experiment it has been found that the citric acid or tartaric acid should be equal to .5% by weight of the sucrose to completely hydrolyze the sucrose when boiled for one hour. However as only one-half the sucrose need be inverted one-half of the foregoing amount of acid can be used or .25% provided the juice is boiled for one hour. This percentage can be employed with any quantity of juice being treated and it will be found that the acid employed will in no way affect the taste or grade of the sirup produced and certainly makes a more satisfactory product.

After the sirup is thoroughly boiled during treatment it is of course properly sterilized and, therefore, is prevented from fermenting inasmuch as it is designed in the present instance to place the treated sirup in sealed bottles or jars that have been thoroughly sterilized.

Obviously by treating large quantities of juice so as to produce the finished product in large quantities, the sirup can be of a uniform color. In the treatment of the juice it is desirable of course to filter the same and this can be done by passing the juice through felt or heavy cotton sacks or the like whereby all suspended matter is removed.

What is claimed is:—

The herein described method of treating the juice of sugar cane in the production of sirup which consists in determining the amount of sucrose contained within the juice, adding thereto an amount of tartaric acid equal to not less than two and one-half per cent of the amount of sucrose present in the juice, thereafter boiling the juice for not less than one hour and subsequently sterilizing the juice.

In testimony that I claim the foregoing as my own, I have hereto affixed my signature in the presence of two witnesses.

RONALD JAMES SLAY.

Witnesses:
JOE COOK,
F. HARRIET LEECH.